Nov. 12, 1935.     J. McHENRY     2,020,511
EGG TESTING AND GRADING MACHINE
Filed June 28, 1934     5 Sheets-Sheet 1
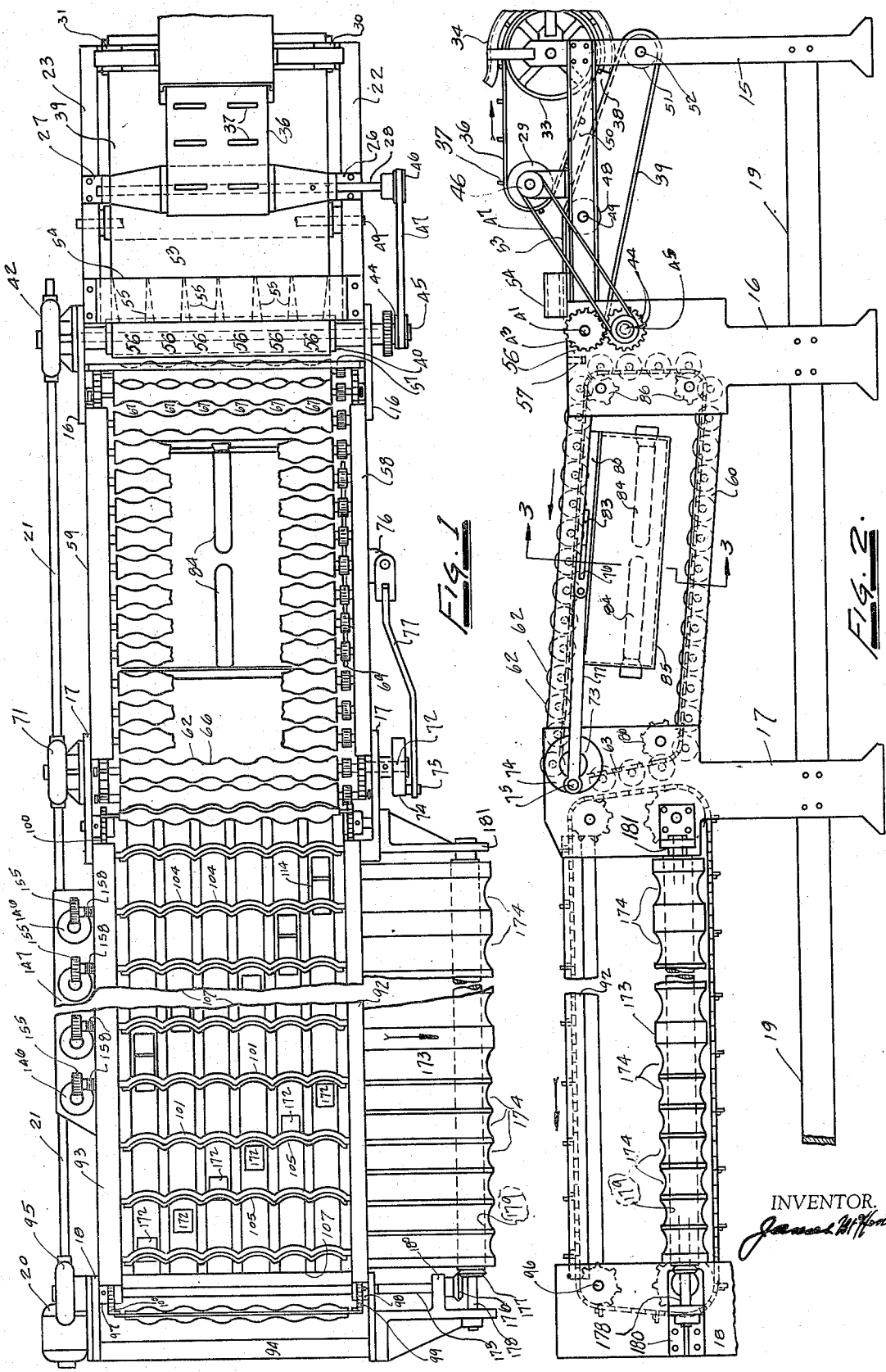
INVENTOR.
James McHenry Nov. 12, 1935.  J. McHENRY  2,020,511

EGG TESTING AND GRADING MACHINE

Filed June 28, 1934   5 Sheets-Sheet 2

INVENTOR
James McHenry

Nov. 12, 1935. J. McHENRY 2,020,511
EGG TESTING AND GRADING MACHINE
Filed June 28, 1934 5 Sheets-Sheet 3
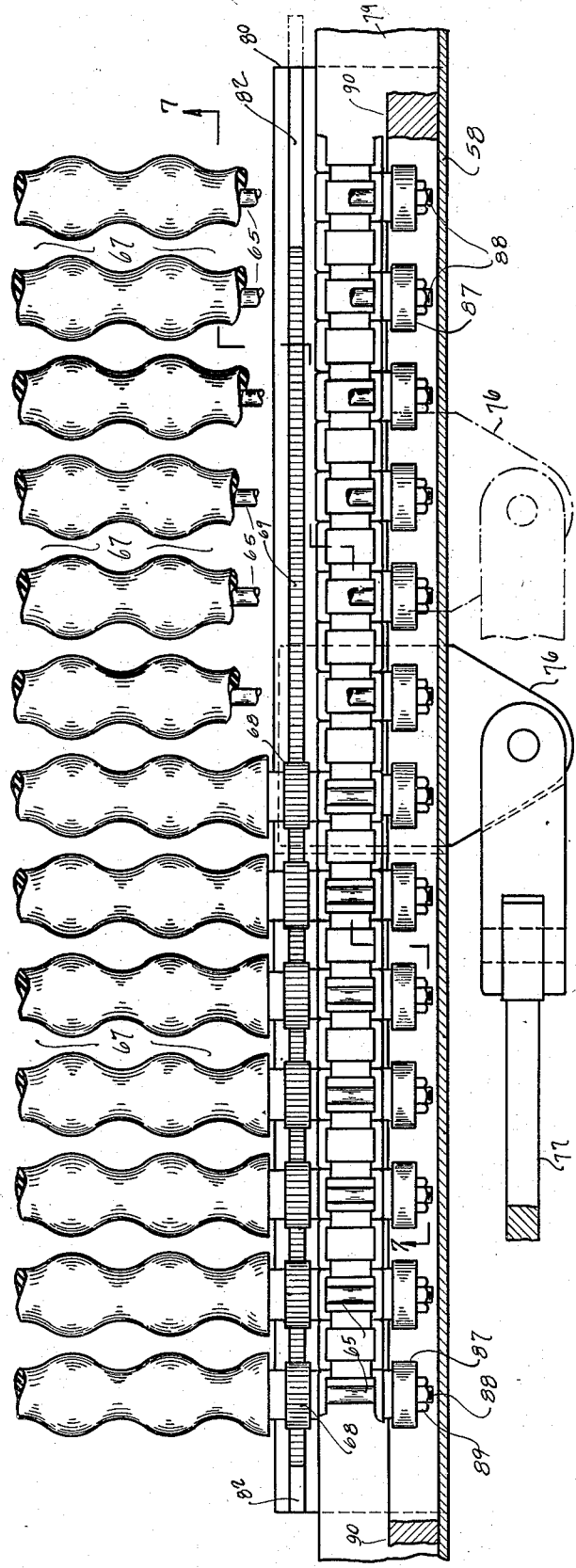
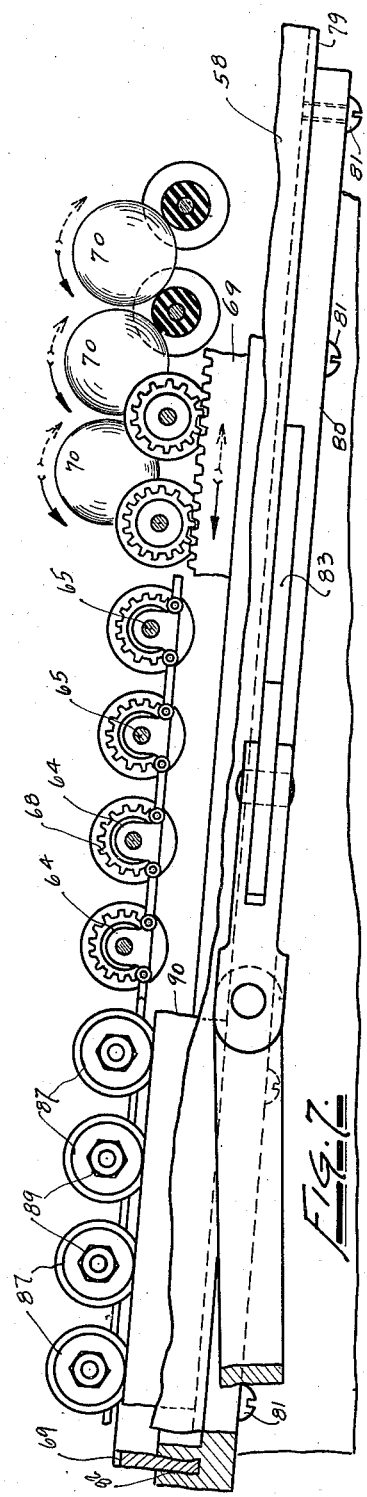
INVENTOR
James McHenry Nov. 12, 1935.                J. McHENRY                2,020,511

EGG TESTING AND GRADING MACHINE

Filed June 28, 1934         5 Sheets-Sheet 4

INVENTOR
James McHenry

Nov. 12, 1935.  J. McHENRY  2,020,511
EGG TESTING AND GRADING MACHINE
Filed June 28, 1934   5 Sheets—Sheet 5
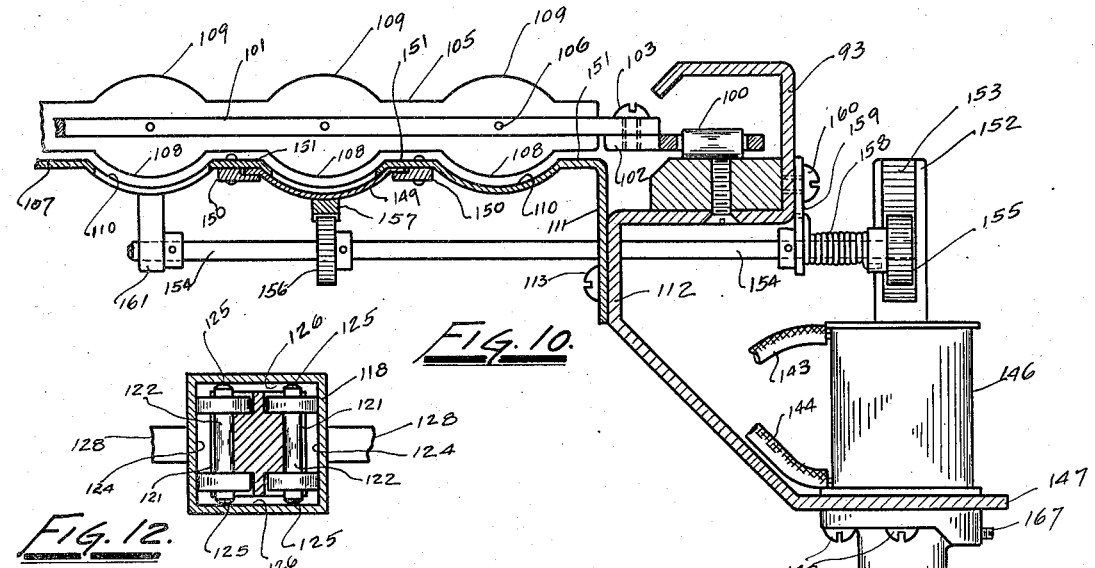
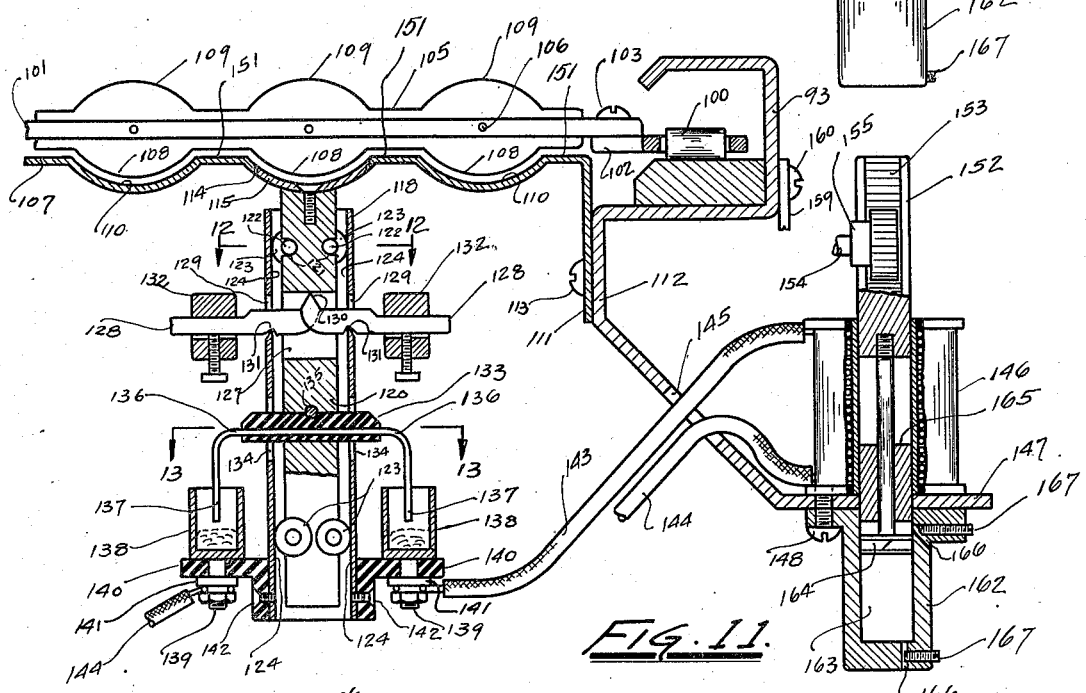
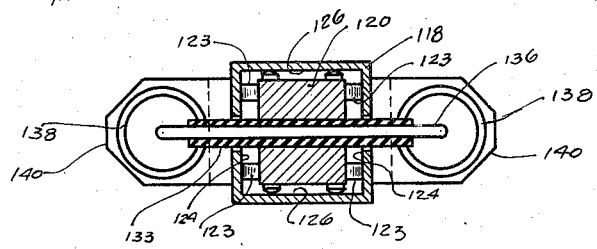
INVENTOR
James McHenry Patented Nov. 12, 1935

2,020,511

UNITED STATES PATENT OFFICE 2,020,511

EGG TESTING AND GRADING MACHINE

James McHenry, Detroit, Mich., assignor of one-half to The Eastern Market Cold Storage Company, Detroit, Mich., a corporation of Michigan Application June 28, 1934, Serial No. 732,803

7 Claims. (Cl. 209—121)

This invention relates to machines for testing and grading eggs and particularly to that type of machine wherein the eggs are moved over a source of light by means of an endless conveyor and graded as to size by determination of weight.

The principal object of the invention is the provision of an improved egg candling and grading machine which is designed to overcome many of the operating objections inherent in present known devices of this kind.

Another object of the invention is the provision of a device which is capable of simultaneously handling a plurality of eggs with increased efficiency and a minimum of loss due to breakage and checking.

The foregoing objects and other advantages of the invention will become more apparent as the description proceeds, reference being made from time to time to the drawings forming part of the disclosure, in which drawings:

Fig. 1 is a plan view of a machine embodying my invention.

Fig. 2 is a side elevation of the machine shown in Fig. 1.

Fig. 6 is an enlarged fragmentary plan view showing the rotating and reciprocating mechanism of the egg candling sub-unit of the machine illustrated in Fig. 1.

Fig. 7 is a vertical sectional view taken along line 7—7 of Fig. 6.

Fig. 10 is an enlarged fragmentary vertical section taken along line 10—10 of Fig. 8.

Fig. 11 is an enlarged fragmentary vertical section taken along line 11—11 of Fig. 8.

Fig. 12 is an enlarged section taken on line 12—12 of Fig. 11.

Fig. 13 is an enlarged section taken on line 13—13 of Fig. 11.

Figure 3:
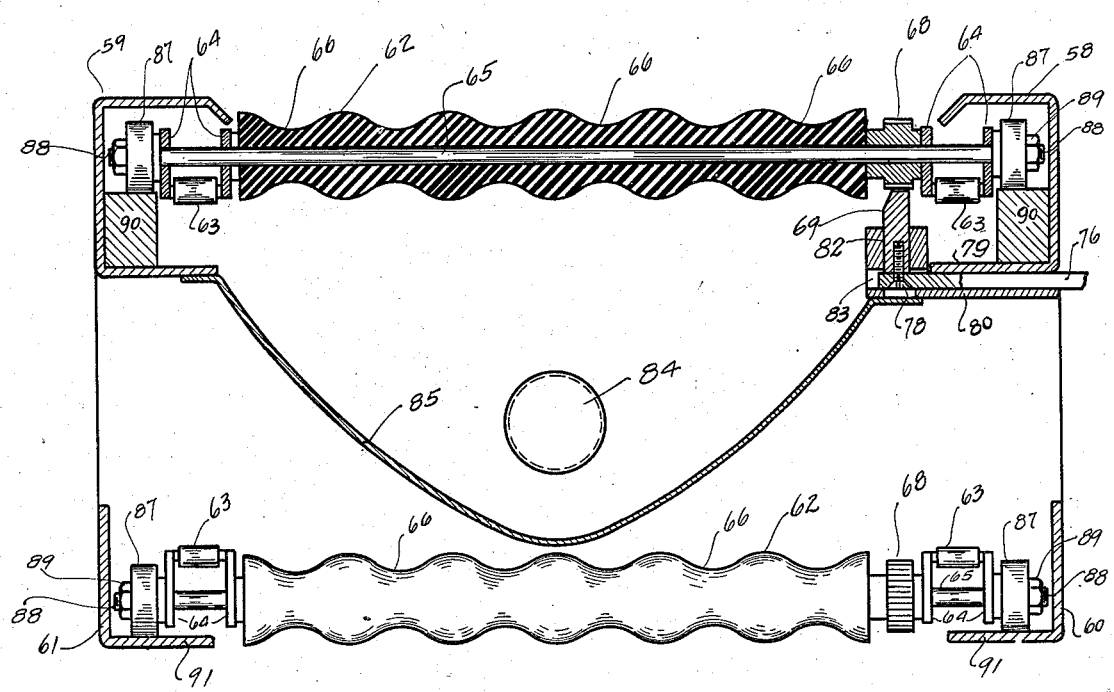
Fig. 3 is an enlarged vertical section taken on line 3—3 of Fig. 2.

Referring now, with more particularity, to the drawings it will be seen that the working elements of the machine are carried and supported by a suitable structural frame consisting of pairs of upright side members 15, 16, 17 and 18 and longitudinal brace members 19 which are preferably secured to the aforementioned upright side members by rivets or other suitable means. Upon one of the side members 18 is mounted a self contained motor and reduction gear 20, to which is connected a line shaft 21 which extends longitudinally along one side of the machine proper and supplies the motive power to the various elements hereinafter described. The pairs of upright side members 15 and 16 are further connected to each other by means of longitudinally extending channel irons 22 and 23 which completes the frame for the loading mechanism which is designed to remove the eggs from cartons 24, (Fig. 4), and feed them to the candling and weighing units hereinafter described. It is the commercial practice to pack six eggs in a row each way in a carton which explains the reason for my device having six longitudinal runways and six curvatures on each conveyor.

Figures 4, 5:
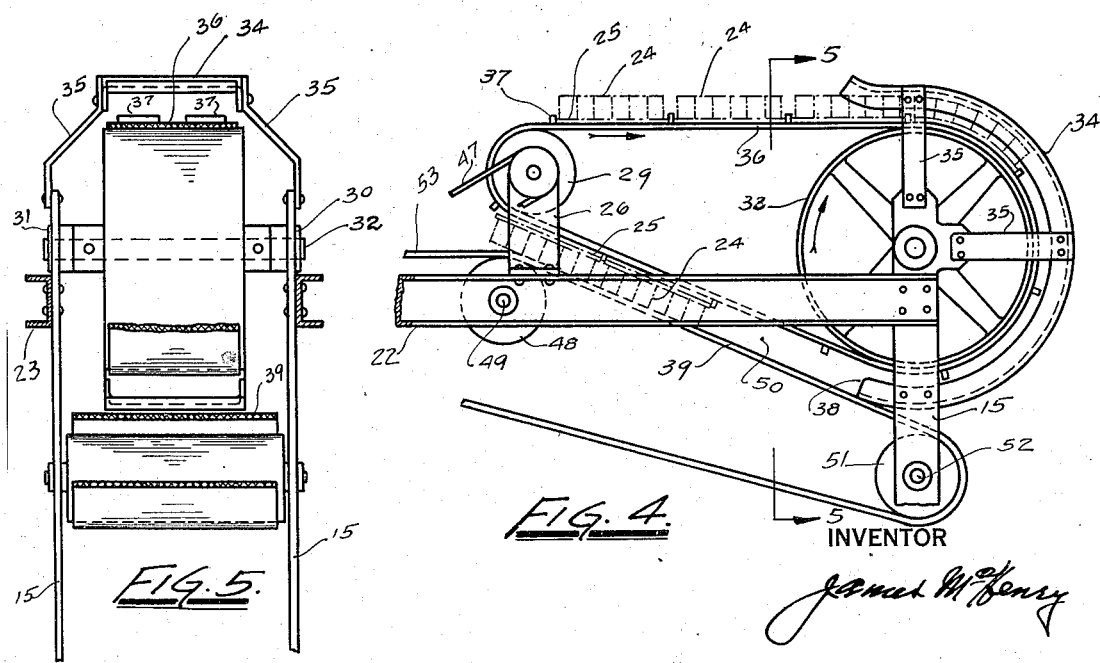
Fig. 4 is an enlarged side elevational view of the loading mechanism of my device.
Fig. 5 is an enlarged vertical sectional view taken along line 5—5 of Fig. 4.

Egg cartons normally have deep nests in which the eggs are carried and the nests rest upon a heavy base member 25 which can not easily be removed from under a carton, therefore a complete turnover has to be effected in order to quickly remove the eggs from the cartons and place them on the conveying belt 36, as is illustrated in Fig. 4. This is accomplished in the following manner: On top of the horizontal channel members 22 and 23, are mounted brackets 26 and 27, which provide the bearings for a drive shaft 28 upon which is fixedly placed a suitable roller 29. Near the top of the upright side members 15 bearings 30 and 31 are provided to receive the shaft 32 upon which is also fixedly mounted a pulley 33 which is of sufficient diameter to allow an egg carton to travel along its outside periphery without bending the carton. Surrounding the pulley 33 is a curved guard member 34, having inturned edges, which forms an inverted U-shaped channel through which the cartons pass. The guard 34 is held in place by brackets 35 which are secured to members 15. A conveyor belt 36 extends tightly over the roller 29 and pulley 33 and travels in the direction indicated by an arrow. The outside periphery of said belt is divided into equal spaces by strips of rubber 37, which are securely fastened thereto, by any suitable means, leaving sufficient space between the strips to receive a carton of eggs, as illustrated in Fig. 4. The strips 37 provide a positive drive for the cartons and no slippage along the path of travel is possible. The cartons, after making a 180 degree turn, will emerge from the guard 34, at point 38, with the base 25 resting on top and thus will pass on to a secondary conveyor belt 39, (Fig. 4), which travels at the same relative speed as the conveyor belt 36. Belt 39 is driven by a roller 40, which is fixed to a drive shaft 41, which has its bearings in the upper end of members 16. The shaft 41 communicates with the drive shaft 21, through suitable gears contained in gear box 42, from which it receives its motive power. To the opposite end of shaft 41 is keyed a gear 43 which meshes with a combination gear and pulley 44, which in turn rotates upon an idler stud 45, which is securely fastened to member 16. A second pulley 46 is disposed in line with pulley 44, which is keyed to the end of the shaft 28. A drive belt 47 travels over the last named pulleys and supplies the operating power for the egg feeding unit. An idling roller 48, fastened to the shaft 49 which is journaled in members 22 and 23, is suitably located so as to produce a break in the direction of travel of the conveyor belt 39, and assures a parallel passage, as indicated at 50, between the upper and lower conveyor belts 36 and 39. Roller 51 moves freely upon shaft 52, which extends between the upright frame members 15 and aids to support the conveyor belt 39. All of the aforementioned members so arranged will co-operate to transport the complete carton of eggs to the horizontal table-like portion 53 of the conveyor belt 39, where the carton 24 and the base 25 may easily be removed, leaving the eggs free to travel under the dividing bridge 54 toward the candling unit. The member 54 consists of a strip of sheet metal which is formed with off-sets at each end to elevate it from the portion 53 of the conveyor 39 and is securely riveted to the frame members 22 and 23 respectively. Secured to the underside of bridge 54 is a plurality of wedge-shaped rubber partitions 55, adapted to direct the individual eggs into the proper channels for candling and inspection.

In order to retard the momentum of the falling eggs, when passing from the portion 53, of the conveyor belt 39, at point 56, a shock-absorbing rubber band 57 is stretched between the members 16 and 16 (Fig. 1).

The elements constituting the sub-unit intended for candling the eggs are supported by the upright side members 16 and 17 and the channel members 58 and 59, and the side rails 60 and 61, which are secured to one another by welding or other suitable means.

The egg conveying system of the candling unit, consists of a continuous link-belt arrangement 63, having a plurality of rollers 62 fastened thereto, by means of protruding lugs 64 as illustrated in Fig. 3. The rollers 62 are preferably made of soft rubber cast around a steel shaft 65. Each of the rubber rollers 62 is provided with six concave surfaces 66, which produce between themselves, cradle like openings 67 in which the eggs are supported and held apart so as to expose a considerable portion of the eggs to a light source. Disposed at one end of each roller 62 is a pinion 68 which is press-fitted onto the rod 65. Each pinion is adapted to mesh during part of its longitudinal travel, with a rack 69 which is slidably supported by the side rail 58. As the pinions mesh with the rack 69 a positive rotation is imparted to the rollers 62 and to the eggs 70, which are supported by such rollers, and when the rack 69 is moved longitudinally, as will be explained hereinafter, a positive reverse rotation is imparted to the rollers 62 and to the eggs 70.

The action just described makes possible a thorough inspection of the eggs and obviates the difficulty, often encountered in machines of this character, of having the eggs caught and broken or checked between a rotating roller and one which fails to rotate because of one reason or another.

The complete link-belt conveyor 63 receives its motive power through a worm gear reduction drive, encased in gear-box 71, which is coupled to the main drive shaft 21 and to the drive shaft 72 which is journaled in the upright side members 17 and upon which are fixedly mounted suitable driving sprockets 73 adapted to engage the link-belt members 63 causing them to move in the direction indicated by an arrow, (Fig. 2).

Upon the free end of the shaft 72 is keyed an eccentric plate 74 to which is secured a stud 75 adapted to impart a reciprocating motion to the push and pull plate 76, through a conventional connecting rod 77. The plate 76 in turn is secured to the rack 69 by means of screws 78 (Fig. 3). A guide block 80 is secured to the underside of the side rail 58 by means of screws 81, said guide block 80 being formed with a longitudinal slot 82 adapted to engage the rack 69 and guide said rack. The guide block 80 is provided with a transverse slot 83 adapted to engage the push and pull plate 76. The rotation of the eggs 70 begins immediately upon the engagement of pinions 68 with rack 69 and ceases after their disengagement.

Positioned below the upper course of rollers 62 of the link-belt conveyor 63, is a light source 84, consisting preferably of one or more tubular bulbs supported longitudinally in a reflector 85, 85 which is secured at one side to the member 59 and at the other side to the guide block 80, in such manner that the light rays are directed through the openings 67.

After the rollers 62, constituting the conveyor 63, have passed over the light source 84 and the reciprocating rack 69, the rollers 62 cease to rotate and the conveyor passes the eggs on to the succeeding sub-unit.

In order to help support the conveyor 63 and maintain its alignment, a series of idling shafts and sprockets are provided as indicated at 86, the latter having their bearings in the upright side members 16 and 17 respectively. In order to further support the weight of the conveyor 63 and eliminate considerable friction of the moving parts, a steel roller 87 is rotatably mounted on each end of each respective shaft 65, and held in place by the threaded ends 88 of shaft 65 and nut 89. The rollers 87 are adapted to engage the rails 90 which are placed along the inside of channel members 58 and 59 respectively. The returning or slack portion of the conveyor 63 is supported by the horizontal flanges 91 of the angle-iron frame members 60 and 61.

After the eggs are candled and inspected they are transported to the weighing and grading sub-unit of the machine which is supported by side members 17 and 18 to which are secured by welding or other suitable means the horizontally disposed channel members 92 and 93, cross-bar 94 and the brace 19.

In this section of the device an endless link-belt arrangement also forms the conveying means for transporting the eggs over the various weighing stations. Its motive power is taken from the reduction gear unit 95 which is connected to the motor 20 and imparted through the drive shaft 96, which is journaled in the upright frame members 18. Attached to the ends of said shaft 96 are sprockets 97 and 98, which are adapted to mesh with the endless link-belts 99 and 100 and drive them in the direction indicated by an arrow.

Figure 8:
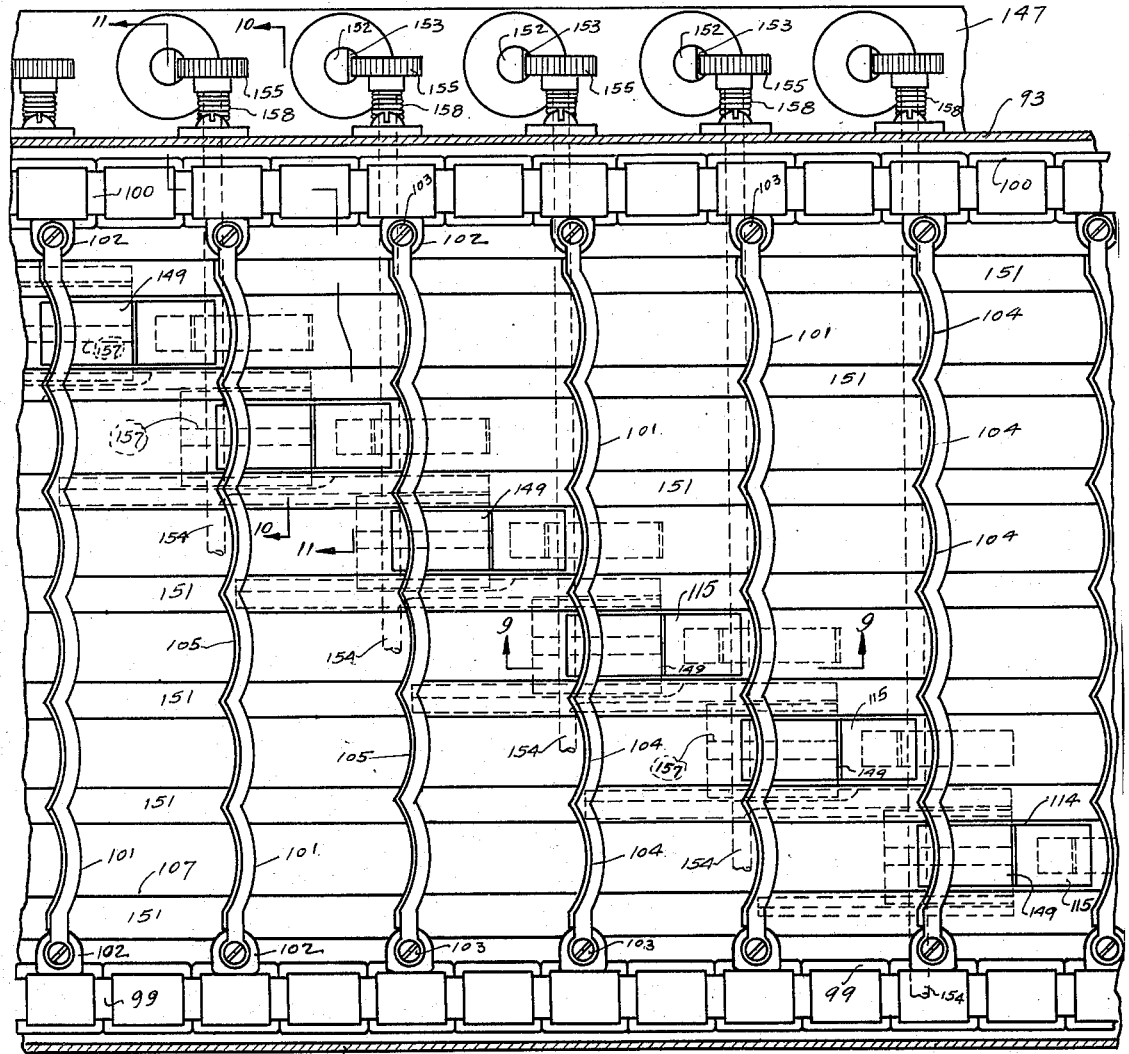
Fig. 8 is an enlarged fragmentary plan view showing the arrangement of the weighing and egg release mechanism of the machine illustrated in Fig. 1.

Equally spaced along the outside periphery of the aforementioned link-belts 99 and 100 is a plurality of push bars 101, which are fastened to sidewardly protruding lugs 102, by means of screws 103 (Figs. 1, 2 and 8). In Fig. 8 it will be seen that the bars 101 have six concave surfaces 104, each adapted to conform to the shape of an egg. To the leading edges of the bars 101, push plates 105 are attached by means of small rivets 106. The push plates 105, when viewed in elevation (Figs. 12 and 13), have downwardly extending curved portions 108, and upwardly extending curved portions 109, which curvatures conform, in size and contour to the curvatures 110, comprising six channels longitudinally disposed along the roll table 107, and conform to the curvatures 66 on the rollers 62 attached to the link-belt 63 heretofore described.

The conveyors of the candling unit and the weighing unit are so synchronized that one of the push plates 104, of the conveyors 99 and 100, is always moving upwardly in horizontal position as the eggs are ready to drop from the rollers 62 of the conveyor 63. This effects a quick but safe transfer of the eggs without breakage or checking, and eliminates the necessity of an intermediate stationary member to assist in the transfer.

The table 107 is interposed between channels 92 and 93 and has downwardly extending flanges 111 adapted to be secured to the extension members 112 of channels 92 and 93 by means of screws 113. A plurality of apertures 114 arranged in staggered relation, are formed in the aforementioned table 107, directly in line with the channels 110. The apertures 114 are of sufficient size to receive the weighing table 115 and traps 149. Six weighing tables and six traps are necessary for each size or grade of egg, inasmuch as there are six channels along which the eggs are moved. An unlimited number of grades can be determined. Fig. 8, however, shows the equipment required for one size or grade of eggs.

Figure 9:
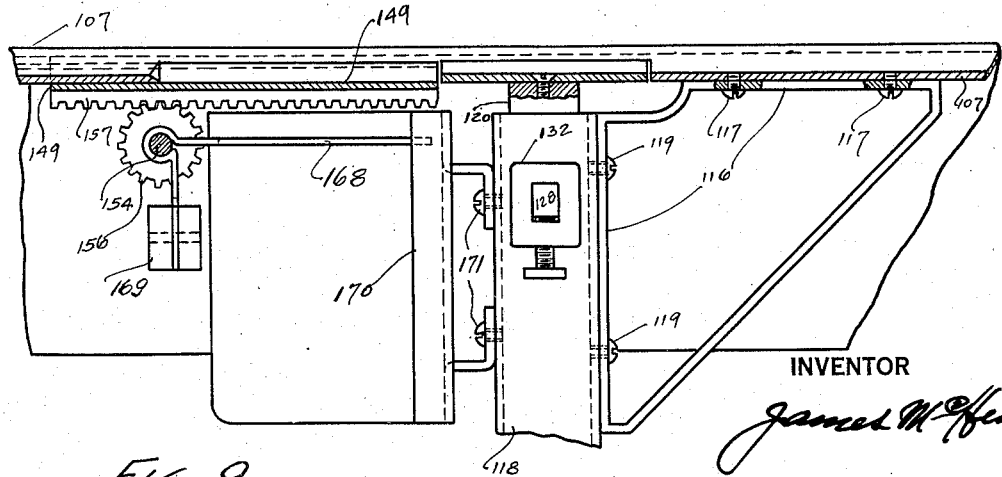
Fig. 9 is a vertical sectional view taken along line 9—9 of Fig. 8.

Vertically positioned beneath the weighing tables 115, is the mechanism for weighing the eggs. This mechanism is supported by a triangular bracket 116, which is secured to the underside of the table 107 by means of screws 117. A square tube 118 is fastened to the bracket 116, by means of screws 119, and is adapted to receive a square floating stem 120 to which is screwed the weighing table 115 (Figs. 9, 11 and 12). Near the upper and lower ends of stem 120, semi-circular holes 121 are provided to receive anti-friction rollers 122, whose peripheries 123 roll against the inner side walls 124, of the tube 118, while their crowned ends 125 ride against the inner side walls 126 of the tube 118, thus securing the stem 120 against horizontal displacement while otherwise allowing it to float vertically with the least amount of friction. A rectangular hole 127 (Fig. 11), is formed transversely through the stem 120 and is adapted to receive twin scale beams 128 which also extend through oppositely disposed apertures 129, formed in the tube 118. The inner ends of the beams 128 are provided with upturned knife edges 130 which normally contact the stem 120. A fulcrum is provided for each beam 128 by beveling the lower edges of the apertures 129 as indicated by 131. Adjustable counter-weights 132 keep the scale mechanism in balance.

Immediately underneath and in the same vertical plane with the beams 128, a square fibre block 133 is passed through the stem 120, and through slots 134 provided therefore in tube 118. This block is held in position by a cross-pin 135. Longitudinally extending through the center of the block 133 is a contact member 136 having its ends 137 bent downwardly and projecting into mercury cups 138. The cups 138 have reduced and threaded ends 139 which pass through fiber brackets 140 and are locked in place by nuts 141. The brackets 140 are attached to the tube 118 by means of screws 142. Lead wires 143 and 144 are fastened to the ends of the terminals 139 and extend through a hole 145 in the member 147 to the solenoid 146 and to a source of electrical current, not shown. Each solenoid 146 is mounted upon a shelf-like portion 147 constituting part of channel member 93 and is secured thereto by means of screws 148. The solenoids are used for the purpose of opening the slidably arranged traps 149 in order to release such eggs as may be heavy enough to force down the weighing tables 115, actuate the scale beams 128 and cause contact to be made between the members 137 and the mercury cups 138. The traps 149 are fitted snugly against the curved underside of the roll table 107 and are retained by guide strips 150 which may be riveted to the unbent portion 151 of the roll table 107 (Fig. 10). The solenoid 146 has a floating core 152 to which is secured by suitable means, rack 153 which is adapted to mesh with a pinion 155 fastened to the end of shaft 154, to which is also keyed a second pinion 156 which is adapted to mesh with a short rack 157 which is secured to the underside of the slidable trap 149. The traps 149 are normally held closed by torsional springs 158 which are secured at one end to the hub of the pinion 155, and at the other to the bearing bracket 159 which is in turn, secured to the outside channel 93 by means of screws 160. Each shaft 154 is provided with a second bearing 161. In order to give an egg sufficient time to fall off the scale and through the trap 149 it is necessary to retard the opening and closing action. This is accomplished by controlling the movement of the floating core 152 of the solenoid 146. To do that I provide a pneumatic check cylinder 162, which is formed as an integral part of the solenoid 146. The pneumatic check cylinder has a bore 163 into which is fitted a brass piston 164 which slidably extends through the stationary iron core 165 and is screwed into the floating or movable core 152. Vent holes 166 are drilled into the cylinder 162 and adjusting screws 167 are placed therein in order to control the speed of the piston movement.

In order to ease the fall of the eggs coming off the weighing tables 115 and through the traps 149, I provide a secondary swingable trap 168, which is loosely secured to the shaft 154, onto which the egg drops and is let down gently because of the counter-weight 169 (Fig. 9). To prevent the eggs from falling backward or against the weighing mechanism, I provide a rectangular shield 170 which is fastened to the tube 118 by means of screws 171.

Eggs which are too light to register on any of the scales 115 are considered off-runs and fall through apertures 172. All eggs graded or ungraded will fall eventually through some aperture and onto a transversely running conveyor belt 173 which transports the eggs from under the conveyor onto a packing table, not shown. This transport belt 173 is preferably made of soft rubber and is provided with grooves 174 in order to keep the different grades of eggs separated. The transport belt 173 receives its motive power from a shaft 175, upon which is keyed at one end a bevel gear 176, which meshes with a similar gear 177 secured to the shaft 178, which forms an integral part of the roller 179 over which the belt passes. The shaft 178 is journaled in brackets 180 and 181 secured to the upright frame members 17 and 18 respectively. A second roller (not shown) is freely mounted to the free members 17 and 18 at the opposite side of the machine and is adapted to help support the conveyor belt 173.

Having described my invention, what I claim and desire to secure by Letters Patent is:

1. In a device of the character described the combination of a frame, a table supported by said frame, said table having a plurality of longitudinally extending channels, a plurality of apertures arranged in staggered relation in said channels, a weighing element disposed beneath each aperture, a slidable trap arranged to cover part of each aperture, means associated with said weighing means for actuating said traps, a plurality of shafts, at least one of which is a drive shaft, journaled in said frame, sprockets on said shafts, endless link belts arranged to engage said sprockets and travel longitudinally around said table, push-bars secured to said link belts, said push-bars being arranged to travel longitudinally over the channels formed in said table, an endless discharge conveyor arranged for transverse movement beneath said table and means for simultaneously driving said link belts and said discharge conveyor.

2. In a device of the character described the combination of a frame, a table supported by said frame, said table having a plurality of longitudinally extending channels, a plurality of apertures arranged in staggered relation in said channels, a slidable trap arranged to close a portion of each aperture, a weighing mechanism disposed beneath each aperture, each weighing mechanism consisting of a vertically disposed tube secured to said table, a vertically reciprocating stem in said tube and scale beams disposed at right angles to said reciprocating stem and arranged to normally maintain said stem in elevated position, electric conductive elements on each stem arranged to contact electric conductive elements on each tube as the stem descends in the tube, a solenoid electrically connected to each of said last named conductive elements and to a source of electric current and means associated with each said solenoid to actuate each said slidable trap.

3. In a device of the character described the combination of a frame, a table supported by said frame, said table having a plurality of longitudinally extending channels, a plurality of apertures arranged in staggered relation in said channels, a slidable trap arranged to close a portion of each aperture, a weighing mechanism disposed beneath each aperture, each weighing mechanism consisting of a vertically disposed tube secured to said table, a vertically reciprocating stem in said tube, anti-friction members on said stem, a concave member secured to the end of said stem and scale beams disposed at right angles to said reciprocating stem and arranged to normally maintain said stem in elevated position, electric conductive elements on each stem arranged to contact electric conductive elements on each tube as the stem descends in the tube, a solenoid electrically connected to each of said last named conductive elements and to a source of electric current and means associated with each solenoid to actuate each slidable trap.

4. In a device of the character described the combination of a frame, a table supported by said frame, said table having a plurality of longitudinally extending channels, a plurality of apertures arranged in staggered relation in said channels, a slidable trap arranged to close a portion of each aperture, a weighing mechanism disposed beneath each aperture, each weighing mechanism consisting of a vertically disposed tube secured to said table, a vertically reciprocating stem in said tube, scale beams disposed at right angles to said reciprocating stem, each of said scale beams having a sharp upturned end adapted to contact said stem, said scale beams having their fulcrums on the sides of said tube and adjustable counter-weights disposed at the outer ends of said scale beams, electric conductive elements on each stem arranged to contact electric conductive elements on each tube as the stem descends in the tube, a solenoid electrically connected to each of the last named conductive elements and to a source of electric current and means associated with each solenoid to actuate each slidable trap.

5. In a device of the character described the combination of a frame, a table supported by said frame, said table having a plurality of longitudinally extending channels, a plurality of apertures arranged in staggered relation in said channels, a slidable trap arranged to close a portion of each aperture, a weighing mechanism disposed beneath each aperture, means on each weighing mechanism for closing an electric circuit, a solenoid electrically connected to said circuit closing means and to a source of electric current and means associated with each solenoid to actuate each slidable trap, said means comprising a rack secured to a movable core positioned within said solenoid, a pinion in mesh with said rack, a shaft for supporting said pinion, a second pinion keyed to said shaft, said second pinion being adapted to engage a short rack secured to said slidable trap.

6. In a device of the character described the combination of a frame, a table supported by said frame, said table having a plurality of longitudinally extending channels, a plurality of apertures arranged in staggered relation in said channels, a slidable trap arranged to close a portion of each aperture, a weighing mechanism disposed beneath each aperture, means on each weighing mechanism for closing an electric circuit, a solenoid electrically connected to said circuit closing means and to a source of electric current, a movable core in said solenoid, a reciprocating piston secured to said movable core, a cylinder arranged to receive said piston, air vents in said cylinder, means associated with each solenoid for actuating each slidable trap, said means comprising a rack secured to said movable core, a pinion in mesh with said rack, a shaft for supporting said pinion, a second pinion secured to said shaft and arranged to mesh with a short rack secured to the under side of said slidable trap.

7. In a device of the character described the combination of a frame, a table supported by said frame, said table having a plurality of longitudinally extending channels, a plurality of apertures arranged in staggered relation in said channels, a weighing element disposed beneath each aperture, a slidable trap arranged to cover part of each aperture, means associated with said weighing means for actuating said traps, a plurality of shafts at least one of which is a drive shaft journaled in said frame, sprockets on said shafts, endless link belts arranged to engage said sprockets and travel longitudinally around said table, push-bars secured to said link belts, said push-bars being arranged to travel longitudinally over said channels and perpendicularly adjacent the ends of said table, plates secured to the leading edge of said push-bars, said plates having concave faces and convex upper and lower edges, said plates being adapted to serve as lifts as said push-bars travel upwardly adjacent one end of said table and means for driving said link belts.

JAMES McHENRY.